Aug. 29, 1939.  A. V. DE FOREST  2,171,303
RESONANT VIBRATION FATIGUE TESTER
Filed Oct. 30, 1937    3 Sheets-Sheet 1
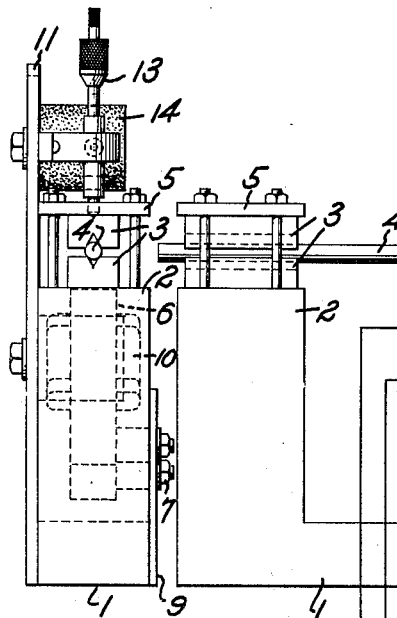
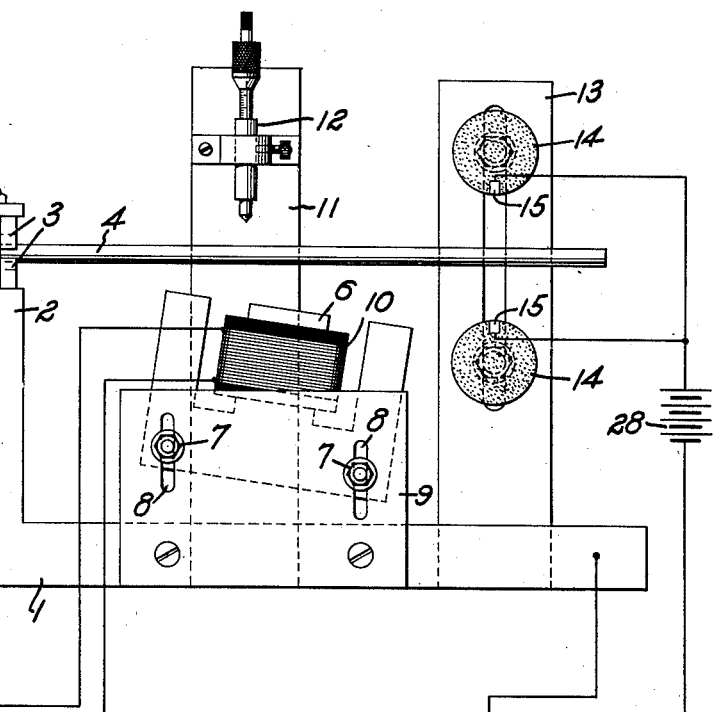
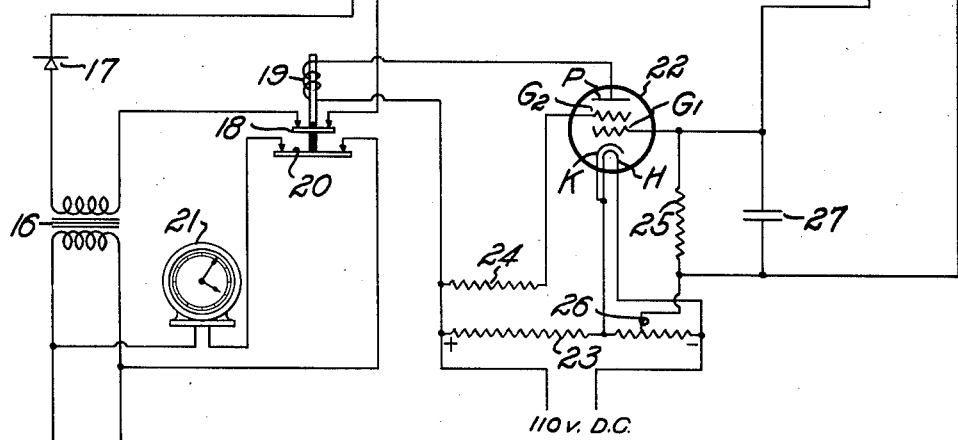
Inventor:
Alfred V. de Forest
By Potter, Pierce & Scheffler
Attorneys.

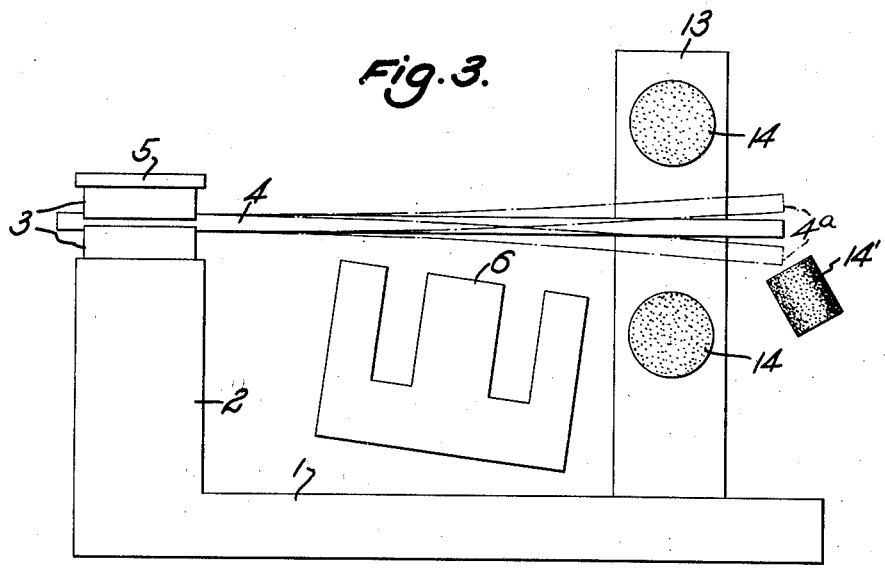
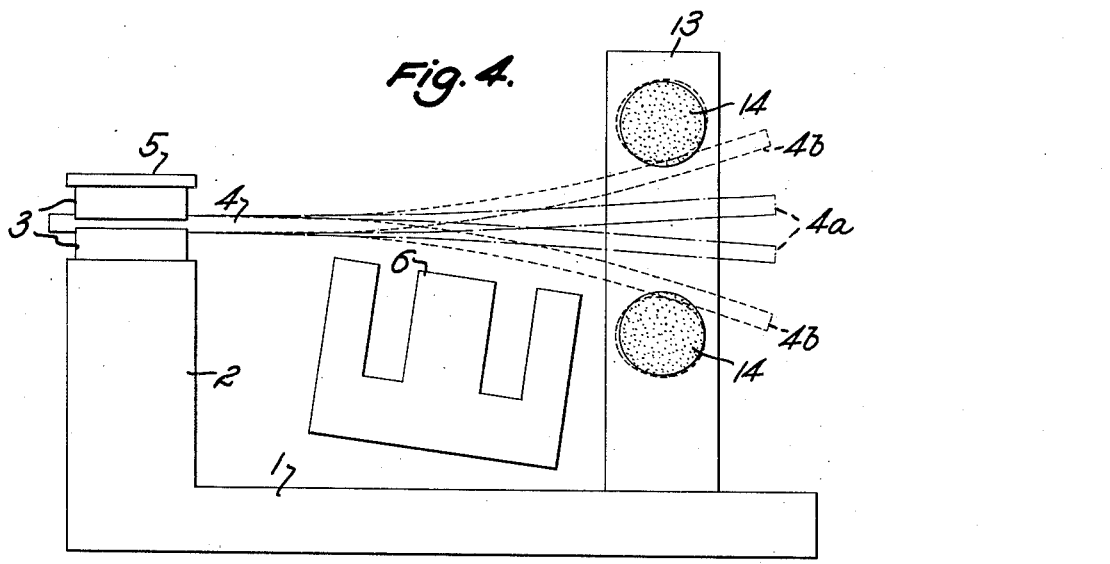

Aug. 29, 1939.   A. V. DE FOREST   2,171,303
RESONANT VIBRATION FATIGUE TESTER
Filed Oct. 30, 1937   3 Sheets-Sheet 3

Inventor:
Alfred V. de Forest,
By Potter, Pierce + Scheffler,
Attorneys.

Patented Aug. 29, 1939

2,171,303

UNITED STATES PATENT OFFICE 2,171,303

RESONANT VIBRATION FATIGUE TESTER

Alfred V. de Forest, Marlboro, N. H., assignor to Research Corporation, a corporation of New York Application October 30, 1937, Serial No. 172,045

15 Claims. (Cl. 73—51)

This invention relates to resonant vibration fatigue testers such as are employed to vibrate an elastic member, comprising either in whole or in part the specimen to be tested, at its natural period for the purpose of investigating fatigue conditions.

Various means have been devised to match the resonant frequency of a bar or other vibrating system, and the frequency of impulses imparted to test bar or vibrating systems. It is possible to build a testing machine with a variable frequency source of vibrations that may be adjusted to match the natural frequency of the test piece, but the usual practice has been to tune the test piece to a fixed frequency. This tuning has been effected by applying weights to the test piece or by adjusting the length of the test piece which projects beyond an adjustable clamp structure.

The prior systems for tuning a bar to match a fixed frequency have presented some difficulty in obtaining an exact tuning of the bar at the beginning of the test and, in general, have made no provision for maintaining that tuning throughout the test. The natural period of vibration of the test piece will vary with the modulus of elasticity which, in most steels for example, will change by about 1% for a change in temperature of 55° F. This variation in the modulus of elasticity is sufficient to change the natural period of resonance sufficiently to influence the amplitude of vibration and therefore the stress by an undesirable and frequently fatal amount. Furthermore, the modulus of the strained material changes with the number of applied cycles of stress due to cold work, aging effects and redistribution of internal stress in the specimen. This effect also causes a variation in the natural frequency which is highly undesirable. The amplitude of vibration is extremely sensitive to small changes in the power input and machines having an electromagnet as the vibrating mechanism may exhibit a 10% variation in the amplitude of vibration of the test specimen upon a 1% variation in the input voltage. Losses of energy at the clamping points or the supports of the machine, and metallurgical change in the specimen due to fatigue are further variations that effect the amplitude of vibration during the test.

Objects of this invention are to provide methods and apparatus that are characterized by a rapid adjustment of the natural period of resonance of the test specimen to the fixed frequency of the testing machine and by the automatic preservation of that mechanical tuning of the test specimen throughout the test. Objects are to provide methods and apparatus for automatically maintaining the amplitude of vibration of a test specimen substantially independent of such variables as temperature, changes in the test specimen, and variations in the power input to the test specimen. Further objects are to provide a novel method and apparatus for increasing the natural period of vibration of an elastic member to a value in excess of that determined by its dimensions and physical properties, which matches the predetermined fixed frequency of a source of vibrations. More specifically, objects of the invention are to provide methods of and apparatus for increasing the natural stiffness of a test specimen by contacting the vibrating test specimen with a damped spring, and for maintaining a substantially constant amplitude of vibration by contacting the vibrating test specimen with one or more energy absorbing elements.

These and other objects and advantages of the invention will be apparent from the following specification when taken with the accompanying drawings in which:

Fig. 1 is a front elevation of an embodiment of the invention, the electrical power supply system being shown diagrammatically;

Fig. 2 is an end elevation of the testing machine of Fig. 1;

Figs. 3 and 4 are schematic front elevations of the essential elements of the machine and showing, respectively, the test specimen vibrating off frequency and in tune with the source of vibrations.

Figure 5:
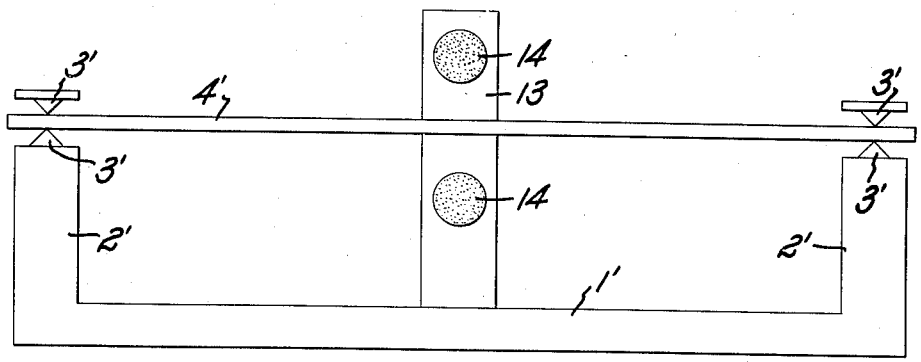
Figs. 5 and 6 are diagrammatic front elevations illustrating modifications of the apparatus.

In the drawings, the reference numeral 1 identifies a base having a post 2 at one end upon which the jaws 3 for holding a test bar 4 are secured by the clamp plate 5. The core 6 of an electromagnet is adjustably mounted below the bar 4 by bolts 7 that pass through slots 8 of a plate 9 that is secured to one edge of the base 1. The center leg of the E-shaped core carries the coil 10 that may be energized, as will be described hereinafter, from an alternating current source such as the customary 60 cycle, 110 volt power and light circuits. A standard 11 is mounted at the other edge of the base 1 to support a micrometer screw 12 for measuring the deflection of the bar 4.

The apparatus so far described is, or may be considered, the equivalent of prior vibration fatigue testers. In accordance with this invention, a standard 13 is fixed to the base 1 adjacent the free end of the test bar 4, the standard being slotted to provide an adjustable mounting for one or, as shown, a pair of damped spring members 14 that are at opposite sides of and spaced from the normal or non-vibrating position of the specimen 4. These members may be rubber stoppers such as used for sealing bottles when the test bar is a heavy steel wire. The illustrated apparatus was constructed for the testing of bars or wires of the order of 0.20 inch diameter and the members 14 were #6 rubber stoppers. Silver contact strips 15 were inserted in longitudinal slots cut in the sides of the members 14 that are presented towards the bar 4.

The circuit for energizing the coil 10 of the electromagnet includes a step-down transformer 16 having a primary winding for connection to a 60 cycle, 110 volt source of alternating current and a secondary winding having one terminal connected through a rectifier 17 to one side of the coil 10. The other side of coil 10 is returned to the transformer through contacts 18 controlled by a relay coil 19. A second set of contacts 20 connects the electric clock 21 across the alternating current power source.

Relay coil 19 is included in the plate circuit of a vacuum tube 22 that is energized from a current source indicated by the legend "110 v. D. C.". A voltage divider 23 is shunted across the current source and the heater H is connected across an appropriate section of the voltage divider adjacent the negative terminal thereof. The screen grid G2 of the tube is connected to the positive terminal of the voltage divider through a resistor 24. A bias resistor 25 is connected between the control grid G1 and a tap 26 that is adjustable along the voltage divider 23 and normally set at negative potential, with respect to the cathode, that will block conduction through the tube. A network for counteracting the blocking bias includes a condenser 27 shunted across the grid circuit resistor 25; the opposite terminals of the condenser being connected to the base 1 and, through a current source 28, to the contact strips 15 of the damped members 14. The constants of the circuit are such that the periodic contact of the vibrating specimen 4 with the contact strips 15 keeps the condenser fully charged and the resultant plate current flow energizes the relay to retain switches 18 and 20 closed. When the specimen 4 develops a fatigue crack, the amplitude of vibration falls off and the charging circuit of the condenser is completely broken. The condenser is discharged and the bias on grid G1 falls to the blocking value determined by the setting of the tap 26. The relay 19 is no longer energized, and switches 18, 20 open to break the circuit to the electromagnet and to the clock 21, respectively.

The testing machine is operated in the following manner. The rod or wire specimen 4 is so clamped in jaws 3 that the length of the projecting portion is somewhat longer than required for exact tuning to the frequency of the source of vibrations. A free length having a natural vibration frequency of about 58 cycles per second is appropriate when the usual 60 cycle alternating current sources are employed to energize the electromagnet. The grid return tap 26 of the tube 22 is temporarily adjusted to a point which permits conduction, or the relay switches 18, 20 are held in manually, to establish a periodic pulsating current to the electromagnet and to start the clock.

The 60 cycle vibratory impulses thus impressed on the test specimen result in vibration of relatively small amplitude, such as indicated by the broken line positions 4a of the specimen in Fig. 3; the vibrations being forced since, as stated above, the specimen has a lower vibration frequency than that of the vibratory impulses. A damped spring or rubber block 14' is then brought into light contact with the vibrating end of the specimen 4 and the additional stiffness thus imparted to the specimen tunes the specimen to the higher frequency of the vibratory impulses and therefore results in an increased amplitude of vibration. The rubber block 14' is moved back from the rod 4 as the amplitude of vibration increases, and is completely removed when the rod swings into contact with the damped springs or rubber blocks 14 of the machine. The specimen then vibrates between the end positions 4b indicated in dotted lines in Fig. 4. The rubber blocks 14 are slightly deformed by the impact of the specimen 4, as is indicated in dotted lines in Fig. 4, and the blocks thus absorb energy from the vibrating system as they impart stiffness to the same.

The specimen remains automatically tuned to the frequency of the vibratory impulses so long as no fractures are developed, and the amplitude of vibration remains substantially independent of the magnitude of the vibratory impulses. Slight variations in the electrical power input tend to increase the amplitude of vibration out of proportion to the power input variation but the illustrated rubber blocks absorb the energy by the inelastic response of the rubber and maintain the amplitude within limits of 1% for a 10% variation in the power input. Separate members may be employed as the damped springs for tuning the vibrating system and for absorbing energy variations due to changes in the power input but, in general, a single system is preferred.

As illustrated diagrammatically in Fig. 5, the method of the invention may be applied to the testing of specimens 4' that are supported by clamp 3' on standards 2' at opposite ends of a base 1'. The standard 13 and damped spring members 14 may be, and preferably are, substantially identical with the corresponding elements of Figs. 1 and 2.

Figure 6:
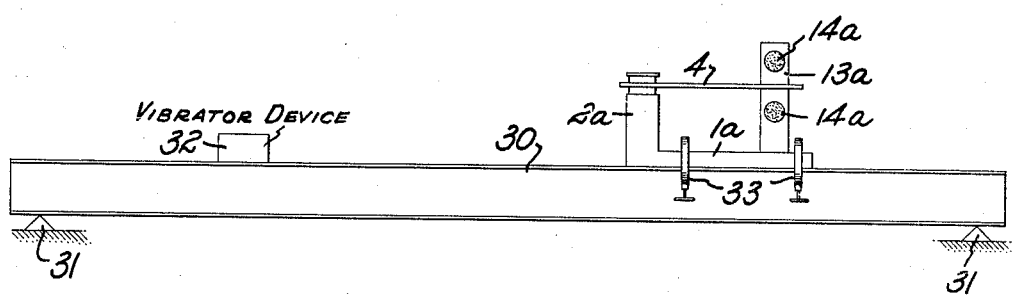

The machine shown in Figs. 1 and 2 is adapted to the testing of magnetic materials that may be vibrated by an electromagnet. The invention may be applied to the testing of non-magnetic materials by the mechanism of Fig. 6. An elastic member such as an I-beam 30 is mounted on spaced supports 31 and has a vibration device 32 of known type secured thereto. A testing unit comprising a base 1a carrying standard 2a and 13a for supporting the specimen 4 and damped spring members 14a, respectively, is attached to the beam 30 by clamps 33.

It is to be understood that the embodiments herein described are illustrative of the invention and that various changes may be made in the several parts, their relative size, shape and locations without departure from the spirit of my invention as set forth in the following claims.

I claim:

1. In the vibration fatigue testing of elastic specimens, the method which comprises subjecting a specimen to a vibration frequency higher than the natural resonance frequency determined by the dimensions and physical characteristics of the specimen, and tuning the specimen while vibrating to the vibration frequency by contacting the specimen with a damped spring element.

2. In the vibration fatigue testing of elastic specimens, the process which comprises impressing upon a specimen periodic vibratory impulses that vary in magnitude, and maintaining the amplitude of vibration of the specimen substantially independent of the magnitude of vibratory impulses impressed upon the same by absorbing energy from the vibrating specimen in accordance with the tendency of the latter to vibrate at increased amplitude as the magnitude of the vibratory impulses increases.

3. In the vibration fatigue testing of elastic specimens, the method which comprises subjecting the specimen to vibration by an energy source of substantially fixed frequency, adjusting the natural period of the specimen to a frequency adjacent and less than the frequency of the vibratory source, and imparting stiffness to the specimen by contacting the same with a damped spring member when placed in forced vibration by said source.

4. A vibration fatigue testing machine comprising means for supporting an elastic specimen, means for impressing upon said specimen vibratory impulses of a frequency adjacent and above the natural frequency of the test specimen, and means to tune the specimen to the frequency of the impressed vibrations; said tuning means comprising damped spring means spaced from the normal non-vibrating position of the specimen for contact by the specimen when vibrating.

5. A testing machine as claimed in claim 4, in combination with means secured to said supporting means for measuring the amplitude of vibration of the specimen.

6. A testing machine as claimed in claim 4, wherein said damped spring means comprises a rubber block.

7. A testing machine as claimed in claim 4, wherein said damped spring means comprises a pair of rubber blocks at opposite sides of the specimen and in path of vibratory movement thereof.

8. A vibratory fatigue testing machine comprising means for supporting an elastic specimen for vibration, means for imparting to said specimen vibratory impulses of a substantially fixed frequency approximating but higher than the natural resonance frequency of said specimen, and means for maintaining the specimen tuned to the fixed frequency of the vibratory impulses throughout the test, said last means including means spaced from the normal non-vibrating position of the specimen for contact by the specimen when vibrating.

9. A vibratory fatigue testing machine as claimed in claim 8, in combination with means responsive to the amplitude of vibration of the specimen for recording the time interval between the beginning of the test and the development of a fracture in the specimen.

10. A vibratory fatigue testing machine comprising means for supporting an elastic member for vibration, a source of energy of variable magnitude for imparting vibratory impulses to the specimen, and means for maintaining the amplitude of vibration of the specimen substantially independent of the variable magnitude of the imparted vibratory impulses, said last means comprising energy-absorbing means positioned in the path of and for contact by said member at the limits of constant amplitude vibration.

11. In a vibration fatigue testing machine, the combination with a base having a standard at an end thereof, means on said standard for clamping an elastic specimen, and means for imparting vibratory impulses to the specimen, of means carried by said base for measuring the amplitude of vibration of the specimen, and means for tuning the specimen to the frequency of the vibratory impulses, said tuning means comprising damped spring means positioned to contact said specimen upon vibration thereof.

12. The invention as claimed in claim 11, wherein said tuning means comprises a standard secured to said base, said standard including means for adjustably supporting said damped spring means.

13. In a vibration fatigue testing machine, the combination with means for supporting and imparting vibrations to an elastic specimen, of means tuning the specimen to the frequency of the impressed vibrations, and means rendering the amplitude of vibration of the specimen substantially independent of variations in the power input of the means for imparting vibrations thereto, said last means comprising energy absorbing means contacted by the specimen upon vibration thereof.

14. The invention as claimed in claim 13, wherein the frequency of the vibrations imparted to the specimen is adjacent and higher than the natural vibration frequency of the specimen, said energy absorbing means constituting said tuning means.

15. The invention as claimed in claim 13, wherein said energy absorbing means comprises rubber blocks at opposite sides of the vibrating specimen.

ALFRED V. DE FOREST.